(No Model.)
W. W. SPEER.
PIPE COUPLING.
No. 315,565. Patented Apr. 14, 1885.
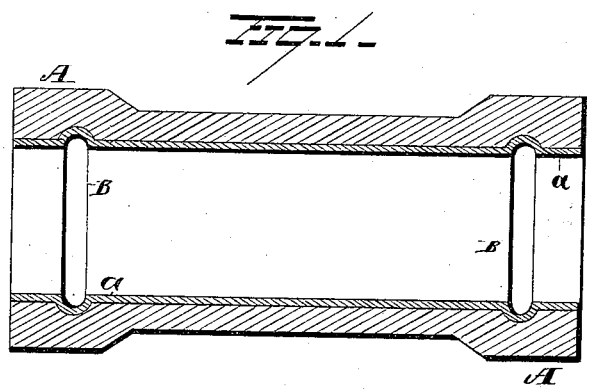
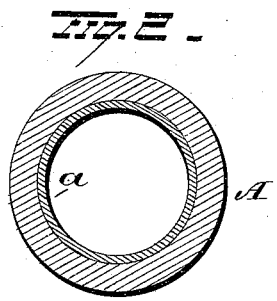
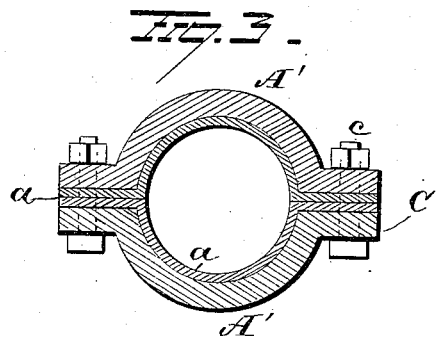
WITNESSES
INVENTOR

UNITED STATES PATENT OFFICE.

WILLIAM W. SPEER, OF PITTSBURG, PENNSYLVANIA.

PIPE-COUPLING.

SPECIFICATION forming part of Letters Patent No. 315,565, dated April 14, 1885.

Application filed February 7, 1885. (No model.)

*To all whom it may concern:*

Be it known that I, WILLIAM W. SPEER, of Pittsburg, in the county of Allegheny and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention relates to an improvement in pipe-couplings.

Hitherto it has been customary to unite the pipe-sections of natural-gas mains by cast-iron sleeves or couplings. These have been found objectionable on account of the pores being sufficiently large to allow the gas to leak through the iron, and not only produce waste, but vitiate the air, making it unhealthy to breathe.

The object of my present invention is to provide a sleeve or coupling which will not admit of the escape of gas, and which will be convenient, durable, and inexpensive; and with these ends in view my invention consists in a cast-iron sleeve having a steel lining.

My invention further consists in certain features of construction and combinations of parts, as will be hereinafter described, and pointed out in the claims.

In the accompanying drawings, Figure 1 is a view of the sleeve or coupling in longitudinal section. Fig. 2 is a transverse section, and Fig. 3 is a transverse section of the sleeve or coupling formed in half-sections.

A represents a cast-iron sleeve having a cast-steel lining, $a$; or the lining might be formed of sheet-steel. The lining $a$ may be welded to the iron or otherwise secured, as may be found desirable. The bore of the sleeve, after the lining is in position, is large enough to form a close fit on the ends of the pipe-sections to be united, and the sleeve is provided with annular grooves B—one near each end—to retain packing.

The sleeve, formed in one section, as above described, is convenient for connecting small pipes or mains; but for larger ones the sleeve or coupling is preferably formed in half sections, as shown in Fig. 3, A' $a'$. The half-sections are provided with flanges C, through which the draw-bolts $c$ pass and secure the sections in position. The pores in the steel lining are so small that the gas does not pass through them, and the trouble from leaking is thus obviated, and, at the same time, the use of the steel lining tends to increase the strength and durability of the coupling.

I am aware that it is not new to line a section of pipe with metal, and do not claim the same, broadly; but, Having fully described my invention, what I claim as new, and desire to secure by Letters Patent, is—

1. A pipe-coupling lined with steel, substantially as set forth.

2. A sleeve for uniting the ends of pipe-sections in gas pipes or mains, consisting, essentially, of a cast-iron sleeve formed in one or more sections and provided with a steel lining, substantially as set forth.

3. A pipe-coupling consisting, essentially, of an iron sleeve having a steel lining and provided with internal annular grooves near each end for receiving packing, substantially as set forth.

In testimony whereof I have signed this specification in the presence of two subscribing witnesses.

WILLIAM W. SPEER.

Witnesses:
    THOMAS D. GRAHAM,
    LAWRENCE BETANCOURT.